United States Patent
Wolford et al.

(10) Patent No.: US 8,917,831 B2
(45) Date of Patent: Dec. 23, 2014

(54) METHOD AND SYSTEM FOR DIRECTING A CALL TO A MATCHING SERVICE

(71) Applicants: Donald C. Wolford, Plant City, FL (US); Sunitha Pillai, Tampa, FL (US); Sridhar R. Thatipalli, Tampa, FL (US); Allison M. Carlson, Tampa, FL (US); Venkat Nekkanti, O Lakes, FL (US); Robert Joseph Kahn, Tampa, FL (US); Joseph R. Vari, Spring Hill, FL (US); Mark N. Stone, Temple Terrace, FL (US); Kaushik Narayanan, Tampa, FL (US)

(72) Inventors: Donald C. Wolford, Plant City, FL (US); Sunitha Pillai, Tampa, FL (US); Sridhar R. Thatipalli, Tampa, FL (US); Allison M. Carlson, Tampa, FL (US); Venkat Nekkanti, O Lakes, FL (US); Robert Joseph Kahn, Tampa, FL (US); Joseph R. Vari, Spring Hill, FL (US); Mark N. Stone, Temple Terrace, FL (US); Kaushik Narayanan, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 50 days.

(21) Appl. No.: 13/649,829

(22) Filed: Oct. 11, 2012

(65) Prior Publication Data
US 2014/0105371 A1 Apr. 17, 2014

(51) Int. Cl.
*H04M 11/00* (2006.01)
(52) U.S. Cl.
USPC .................................. 379/88.18; 379/88.01
(58) Field of Classification Search
USPC .................. 379/88.01, 88.18, 93.12
See application file for complete search history.

(56) References Cited

U.S. PATENT DOCUMENTS

| 8,169,899 B2* | 5/2012 | Gisby et al. ............... 370/230 |
| 2006/0029190 A1* | 2/2006 | Schultz ................. 379/88.01 |

* cited by examiner

*Primary Examiner* — Simon King

(57) ABSTRACT

An approach for directing a call to a matching service of a call destination is described. A call matching manager determines that a call is to be redirected from a first voice response unit based on service data about a service and caller data about a caller. The call matching manager also queries, during the call, one or more databases corresponding to a plurality of other services to identify a matching service based on the caller data. Still further, the call matching manager initiates transfer of the call for processing by a second voice response unit via out-of-band telephony signaling using a generated reference value.

20 Claims, 7 Drawing Sheets

100

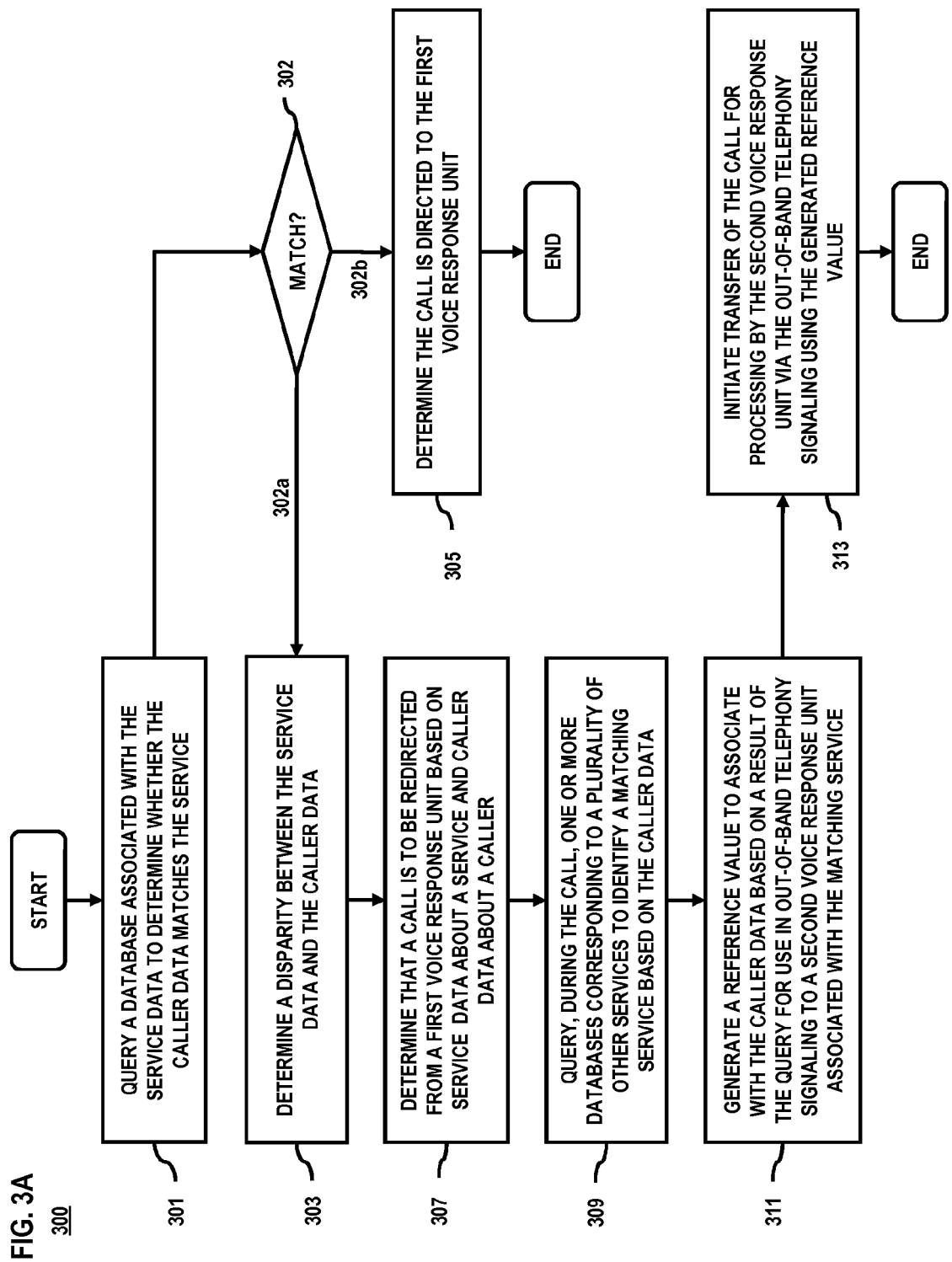

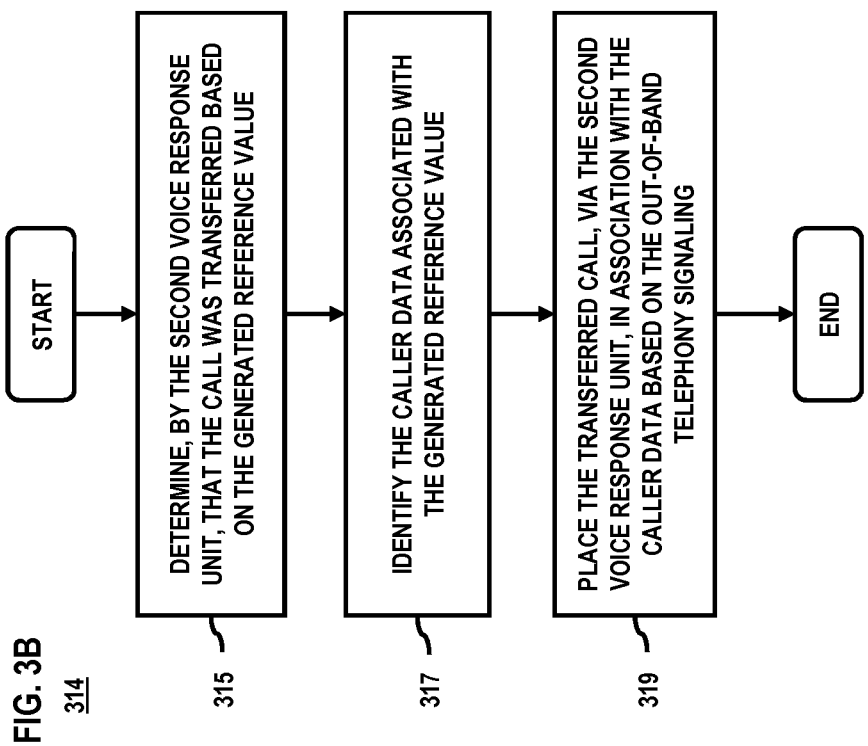

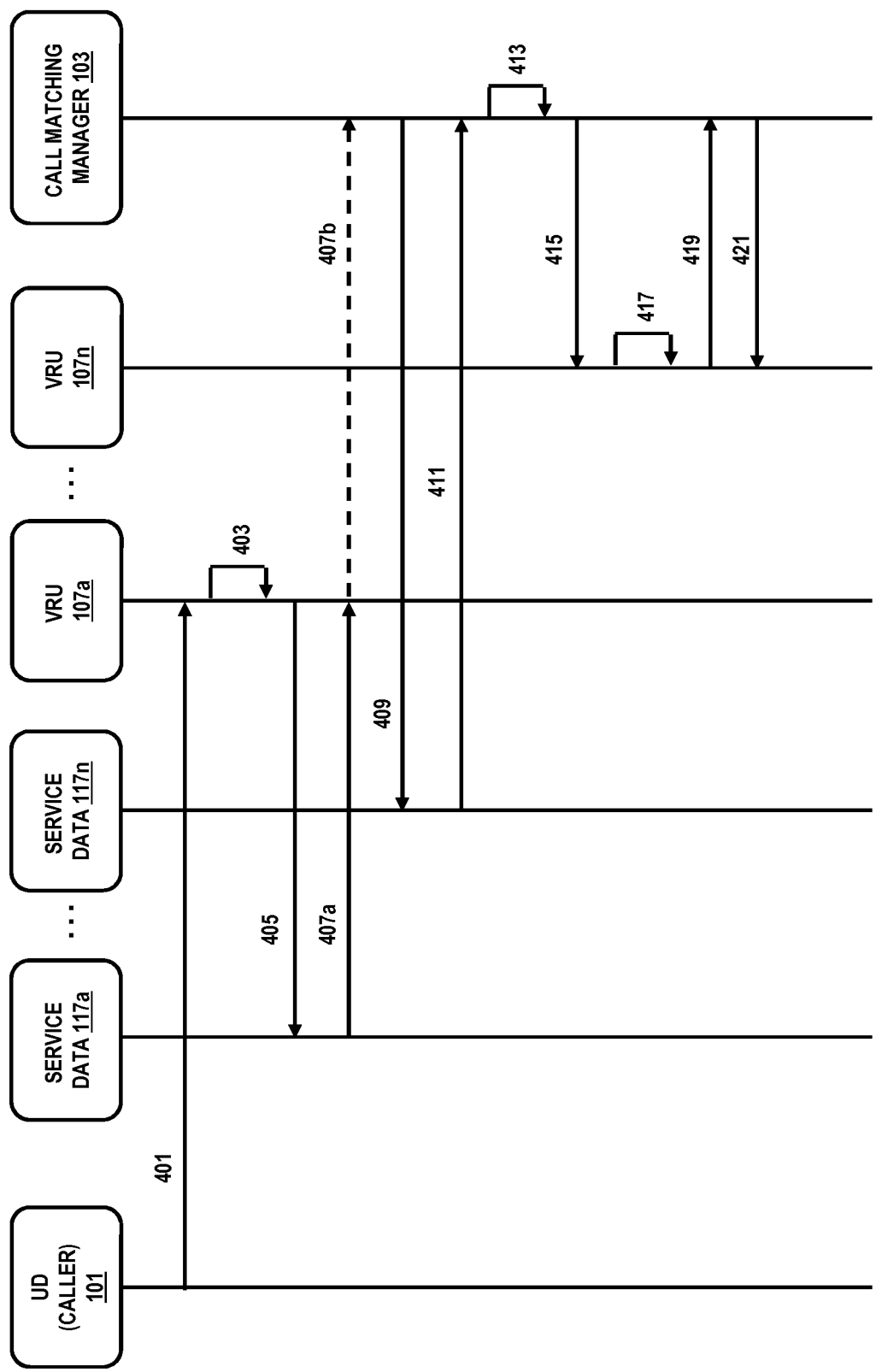

US 8,917,831 B2

METHOD AND SYSTEM FOR DIRECTING A CALL TO A MATCHING SERVICE

BACKGROUND INFORMATION

Network providers are continually challenged to deliver value and convenience to consumers by providing compelling services and advancing the underlying technologies. One area of interest has been the development of services and technologies for effectively placing incoming calls to a correct service (e.g., business unit or department) of a call destination. By way of example, many organizations employ a telephony system for receiving, directing and placing calls to an appropriate service within the organization. Unfortunately, the telephony systems are not configured to automatically and seamlessly transfer calls inadvertently directed to the wrong service of the organization to the desired service.

Based on the foregoing, there is a need for directing a call to a matching or intended service of a call destination.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are flowcharts of processes for directing a call to a matching service of a call destination, according to various embodiments;

FIG. 4 is a ladder diagram depicting seamless transfer of a call from a first voice response unit to a second voice response unit per the processes of FIGS. 3A and 3B, according to various embodiments;

DESCRIPTION OF THE PREFERRED EMBODIMENT

An apparatus, method and software for directing a call to a matching service of a call destination are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to calls exchanged over a telephony network or wireless network, it is contemplated these embodiments have applicability to any data protocols, methodologies or systems for exchanging calls via a data network or service provider network (e.g., Internet).

Figure 1:
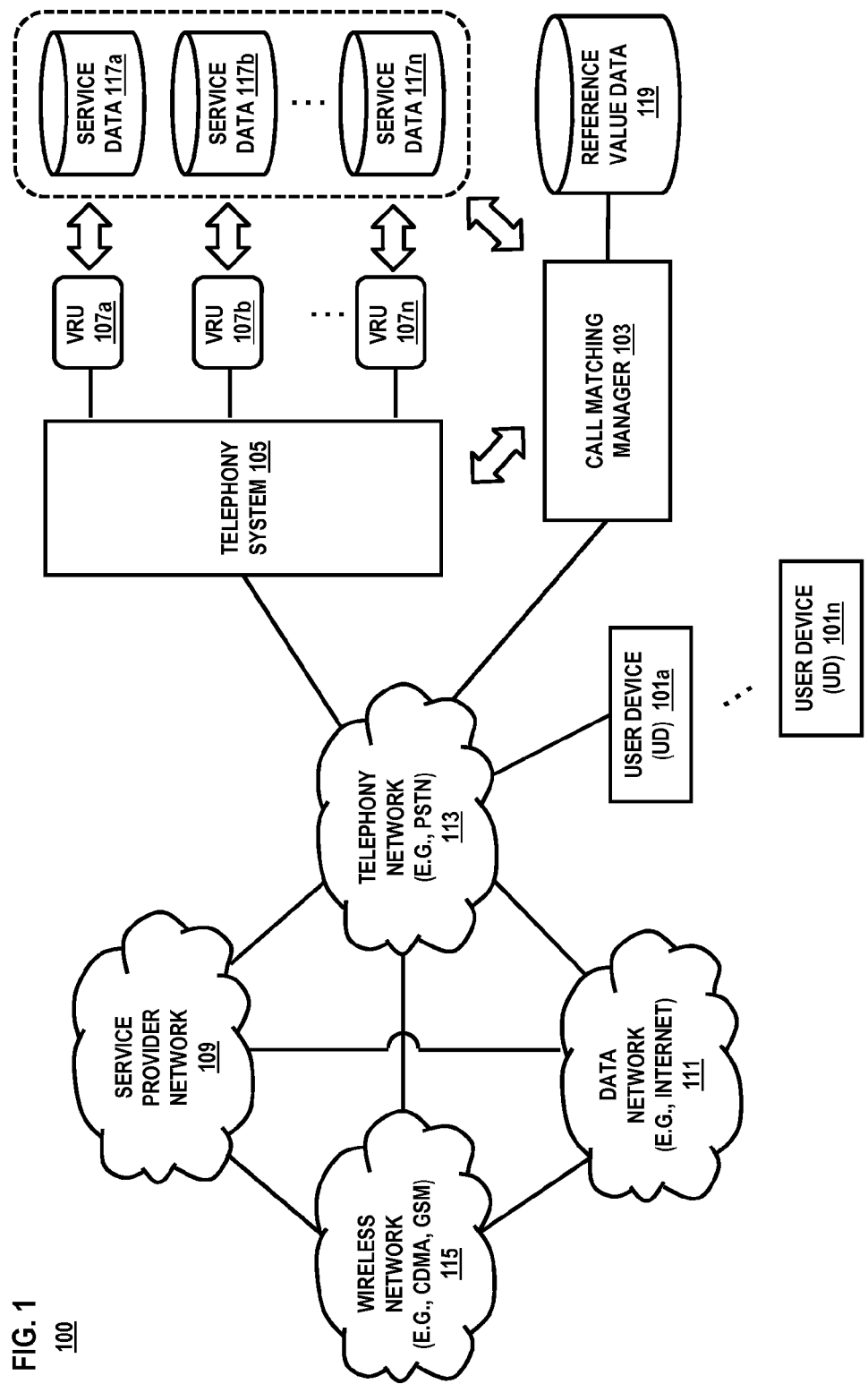
FIG. 1 is a diagram of a system for directing a call to a matching service of a call destination, according to one embodiment.

FIG. 1 is a diagram of a system for directing a call to a matching service of a call destination, according to one embodiment. For the purpose of explanation, system 100 is shown to include one or more user devices 101a-101n (e.g., mobile device, smart phone, netbook, laptop, set-top box, or any communications enabled computing device), referred to herein collectively as user devices 101. Also, system 100 is shown to include a telephony system 105 that features one or more voice response units (VRUs) 107a-107n, referred to collectively herein as VRUs 107; moreover, VRUs are also referred to as interactive voice response (IVR) systems. It is noted that the VRUs 107a-107n may be assigned to different business units or services and may be administered by one or more service providers (or administrators). In certain embodiments, the VRUs 107a-107n serve a number of agents (e.g., customer representatives) dedicated to the particular service; such agents may be live agents, virtual agents, or a combination thereof. Under system 100, the intended service agent may be reached, despite the fact that the initial call was effectively misdirected.

By way of example, the telephony system 105 is configured to a telephony network 113 or other network type to facilitate the exchange of call data and signal information (e.g., Signaling System No. 7 (SS7) or integrated services digital network (ISDN)). It is also contemplated that the telephony system 105 be a packetized voice system (e.g., Voice Over IP (Internet Protocol)), whereby appropriate IP telephony interfaces and gateways are employed.

As noted previously, many organizations employ a telephony system as a means of receiving, directing and placing calls to an appropriate service within the organization. In addition, the telephony system may be configured to support the transfer of calls from one service to another. By way of example, an organization in the form of a company may feature different employees that work in multiple different departments of the business. Under this scenario, each department may represent a different service, unit or segment of the company and may therefore feature different phone numbers (e.g., Product A technical support versus Product B account services). In this way, a customer may call in directly to the service, segment or unit of the company that aligns with their needs, product and/or service category or established accounts.

In certain instances, however, a caller affiliated with one service calls a number associated with a different service. For example, when a call is placed, it is received by a dedicated voice response unit (VRU) of the telephony system that is meant to serve as a dedicated agent for facilitating calls on behalf of a specific receiving service. As such, the VRU of an associated service only has access to information associated with that service. Thus, when the caller is prompted by the VRU to enter an account number, telephone number, customer identifier, service identifier or other data about the caller or the service, the credentials cannot be found. Hence, the user must be rerouted manually to the service they seek or directed to a general call center for further direction, which diminishes the caller experience. Unfortunately, telephony systems are not configured to automatically and seamlessly transfer calls directed to the wrong service to the correct service.

To address this issue, system 100 presents a call matching manager 103 that enables the querying of multiple different databases 117a-117n associated with different services in response to an incoming call not being properly directed. By way of example, the call matching manager 103 is configured to operate in connection with a telephony system 105 associated with an organization, company or provider of a plurality of services representing a call destination. In certain embodiments, the call matching manager 103 is triggered by the telephony system 105 in response to a determination that a call placed by a caller to a first service is not associated with the caller. In addition, the call matching manager 103 facilitates transfer of the call to another service that is associated with the caller. Under this approach, the call placement and transfer procedures are performed seamlessly, i.e., during the call without requiring manual call placement or additional intervention by the caller.

The determination that the caller is not associated with the first service is based on a verification procedure performed by a dedicated VRU 107a-107n associated with the first service. For example, when a caller places a call to the first service via a dedicated telephone number, a VRU 107a corresponding to that service receives the call via the telephony system 105. The VRU 107a, serving as a call placement and facilitation agent for the first service, then prompts the user to enter corresponding caller data for enabling caller verification. In certain embodiments, the caller data may include a caller identifier, a phone number of the caller, a customer identifier, an account identifier, source information associated with the caller or the like. Alternatively, the caller data may be automatically identified via signaling or various data propagation techniques.

Once the caller data is entered, the VRU 107a then queries a service database 117a associated with the service to determine whether the caller data matches the service. The service data 117a-117n may include, for example, various files for specifying a user profile for one or more callers, account information for one or more callers, service configuration and settings criteria and other information that may reference the caller with respect to a given service. In addition, the service databases 117a-117b, referred to herein collectively as service database 117, may include information for specifying a particular name, location, database reference for indicating a particular service to which a user is affiliated. As such, when the service database 117a for the associated VRU 107a includes a reference to the entered data about the caller, the VRU 107a verifies the relationship (e.g., match found) between the caller and the service and places the call accordingly. Alternatively, when no reference to the entered caller data is identified as service data 117a per the query, the VRU 107a invalidates the relationship (e.g., no match found) and triggers execution of the call matching manager 103.

In certain embodiments, when it is determined the caller does not match the initial service, the call matching manager 103 performs a query of the plurality of other databases 117 associated with the telephony system 105. The query is performed across all of the databases 117 not subject to the initial query, i.e., as performed for the above described verification process, thus encompassing all of the additional services associated with the telephony system 105. With respect to the above described scenario, the call matching manager 103 may query service databases 117b-117n based on a determined invalidity of the caller with respect to service database 117a. The query mechanism performed by the call matching manager may be implemented as a web service, data mining technique or other procedure for performing fast lookup and data retrieval using the entered caller data as a reference/search variable. As such, the web service execution enables the call matching manager 103 to readily identify and retrieve service data related to the caller while the call is still active. In addition, the query mechanism enables the call matching manager 103 to determine which of the services the call is to be directed based on the relationship between the call data and the service data.

It is noted that, in the case of a web service based query, a primary web service may interact with one or more web service agents associated with each respective services. For this implementation, the primary web service may call on different web service agents to perform the querying of a respective service database 117b-117n then return the query result (e.g., data found or not found) to the primary web service. Also of note, the call matching manager 103 may retrieve any service data determined to be associated with the caller per the query so that this data may be carried over to another VRU 107 to which the call is to be transferred. It is contemplated that the call matching manager 103 may employ various data querying, identification and retrieval techniques accordingly.

Once the service to which the call is associated is identified—per the query procedure—the call matching module 103 then facilitates transfer of the call to matching service accordingly. By way of example, the call matching manager 103 generates a reference value for use in performing out-of-band telephony signaling to a second voice response unit associated with the matching service. Under this approach, the signaling may be performed in accordance with a signaling protocol (e.g., Signaling System No. 7 (SS7) or integrated services digital network (ISDN)) for conveying call control information in association with the transferred call. As such, the signal for conveying the generated reference value may therefore be processed and/or interpreted by the VRU of the matching service as a phone number or automatic number identification (ANI) data for enabling the transfer.

It is noted that in certain telephony system 105 implementations, the call matching manager 103 may generate the unique reference value as a means of spoofing the VRU 107 of the matching service. For example, the unique reference value may be generated in a format that is identical to ANI data or a phone number for being signaled to the VRU of the matching service. As such, the VRU 107 associated with the matching service interprets the unique reference value as ANI data regarding the transferred call. Alternatively, the reference value may be generated in accordance with other formats.

In certain embodiments, the call matching manager 103 associates the caller data, as provided by the user, with the generated reference value. By way of example, the reference value is stored in connection with the caller data (e.g., a phone number entered by the caller) to a reference value database 119. The call matching manager 103 then initiates transfer of the call, which includes directing the call along with the associated signal information for specifying the unique reference value to the VRU 107 of the matching service.

Once the transfer is made, the VRU 107 of the matching service processes the unique reference value (e.g., as ANI data) as signaled and determines the call is a transfer from the call matching manager 103. In response, the VRU 107 of the matching service calls upon the call matching manager 103 to acquire the caller data (e.g., the phone number entered by the caller) associated with the unique reference value. By way of example, the call matching manager 103 retrieves the associated caller data from the reference value database 119 accordingly. Under this approach, the call is able to be transferred to the matching service and placed by the VRU 107 in association with the actual phone number entered by the caller as placed with the incorrect service. As noted, the transfer is performed in a manner wherein the additional caller intervention or manual placement of the call by an operator is not required.

By way of the above described approach, the efficiency of the telephony system is enhanced for the benefit of the caller and the provider of the telephony system 105. For example, in the case of a business or call center, a calling customer requires less time to reach the service they require. In addition, the caller is more efficiently routed to a matching service even when they initiated the call to a service to which they are not associated. Also, from the perspective of the provider of the telephony system 105, the caller experience is enhanced while the amount of time required by employees/operates to manually route calls is reduced.

In certain embodiments, user devices 101a-101n, the call matching manager 103, the telephony system 105 and other elements of system 100 may be configured to communicate via a telephony network 113. According to certain embodiments, one or more networks, such as service provider network 109, data network 111 and/or wireless network 115 can interact with the service provider network 109. Networks 109-115 may be any suitable wireline and/or wireless network, and be managed by one or more providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, Internet protocol multimedia subsystem (IMS), or other suitable infrastructure to support control and signaling functions.

According to exemplary embodiments, end user devices (not shown) may be utilized to communicate over system 100 and may include any customer premise equipment (CPE) capable of sending and/or receiving information over one or more of networks 109-115. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
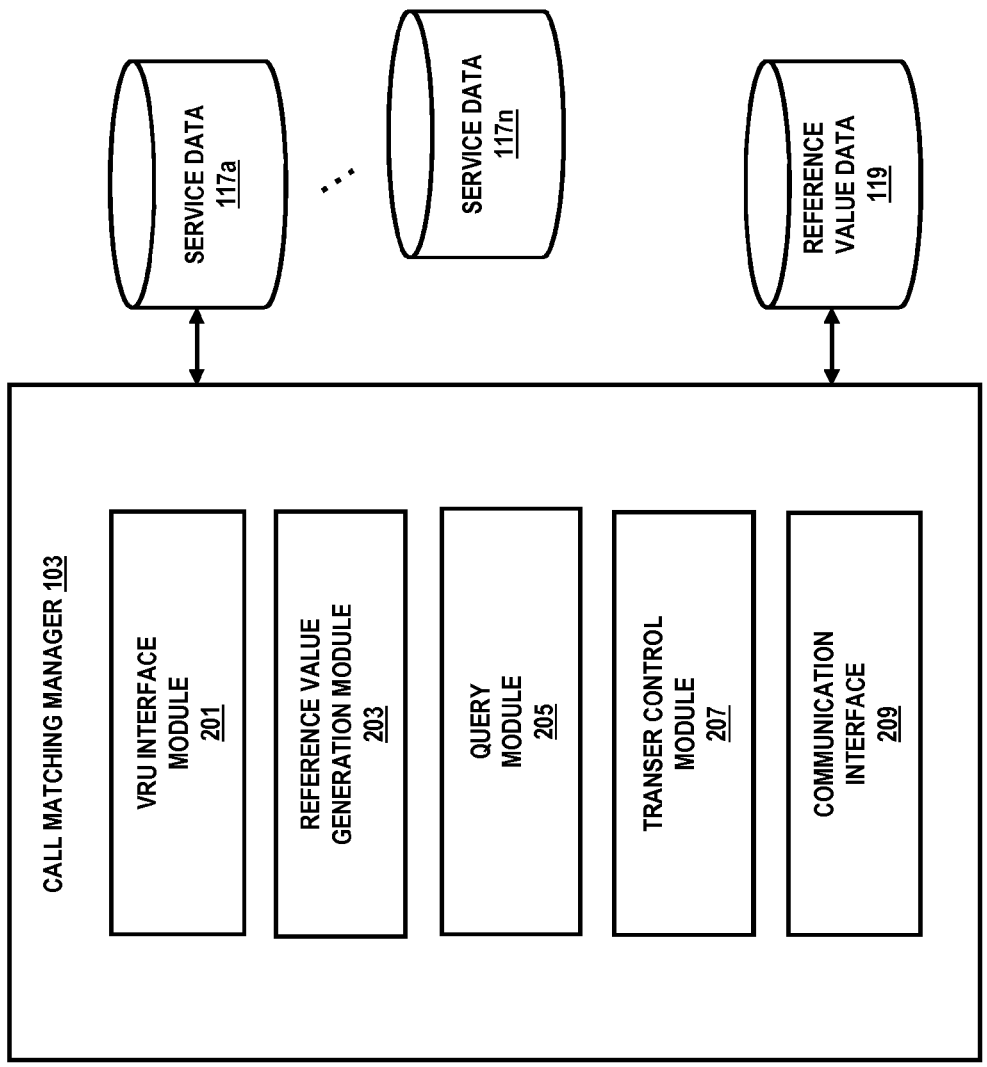
FIG. 2 is a diagram of a call matching manager, according to one embodiment.

FIG. 2 is a diagram of a call matching manager, according to one embodiment. The call matching manager 103 includes various executable modules for performing one or more computing, data processing and telephony based instructions that in combination provide a means of resizing a network tunnel. Such modules can be implemented in hardware, firmware, software, or a combination thereof. By way of example, the call matching manager 103 may include a VRU interface module 201, a reference value generation module 203, a query module 205, a transfer control module 207, and a communication interface 209.

In addition, the call matching manager 103 also accesses one or more service databases for accessing data about the various services associated with telephony system 105. In addition, the call matching manager 103 maintains a reference value database 119 for storing unique reference values generated by the reference value generation module 209. It is noted that modules 201-209 may access databases 117 and 119 for carrying out several of their distinct functions.

In one embodiment, the VRU interface module 101 interacts with the VRUs 117 associated with the respective different services configured to the telephony system 105. By way of example, the VRU interface module 201 transfers caller data entered by the user during interaction with a first VRU to the reference value generation module 203. This includes, for example, after the first VRU prompts the user to enter their credentials, i.e., caller data such as a phone number or account number.

Also, the VRU interface module 201 receives a trigger signal from a calling VRU to initiate execution of the call matching manager 103 in response to a determination a call is initially directed to the wrong service. This corresponds to an initial lookup by the first VRU, wherein the first VRU determines that the entered caller data does not correspond to service data of the associated service. In addition, the VRU interface module 201 initiates execution of the query module 205 for querying the various service databases 117 as well as the reference value database 119. It is noted, therefore, that the VRU interface module 201 may support direct communication with the VRUs 117 of a telephony system, such as via the communication interface 209, including direct trigger signal transmission.

In one embodiment, the query module 205 carries out the querying of the various service databases 117. By way of example, the query module 205 may call upon one or more web services or agents thereof for performing a query of the various service databases 117. In certain embodiments, the query is performed by the query module 205 based on the entered caller data for identifying service data corresponding to/matching the caller data. It is noted, therefore, that the query module 205 may return a matching service result as well as retrieve service data 117 that matches the caller data.

In one embodiment, the reference value generation module 203 generates a unique reference value to associate with the caller data based on a result of the query. Once generated, the unique reference value is then stored to the reference value database 119 accordingly in association with caller data. It is noted that the unique reference value is used for supporting out-of-band telephony signaling and may be generated in a known format for enabling call transfer. Hence, the format may enable a second VRU 107 to interpret the reference value as an internal transfer.

Also, the reference value is generated such that it is distinguishable from any reference values normally used by the same VRU 107 (over the same call channel). For example, if the reference value is transferred as automatic number identification (ANI) information, the value generation module 203 determines what normally valid ANI data is used for handling calls by that VRU 107. Based on this determination, a distinguishable reference value is generated so that the matching VRU can recognize it as a reference value instead of as normal ANI data. By way of example, the reference value may be generated to include an initial area code digit of one or zero; values which are not permitted by certain communication authorities or regulations (e.g., North American Numbering Plan) as valid area code designations for ANI data. Hence, placement of these values within the area code of the ANI data designates the data as a reference value instead of as the caller's telephone number. This execution is performed by the value generation module 203 in instances where an existing VRU 107 uses ANI data for displaying or providing a caller's telephone number.

In one embodiment, the transfer control module 207 facilitates the transfer of a call in association with signal information to a VRU 107. In addition, the transfer control module 207 may operate various channel and data routing procedures for ensuring successful placement of a call. The call transfer and placement procedures may be carried out in connection with a communication interface 209, which in one embodiment, enables formation of a session over a telephony network 113 between the matching service and a user device 101 of a network provider. By way of example, the communication module 209 executes various protocols for enabling collaborative execution between a user device 101 of a caller (e.g., mobile devices, laptops, smartphones, tablet computers, desktop computers) and the call matching manager 103.

The above presented modules and components of the call matching manager 103 can be implemented in hardware, firmware, software, or a combination thereof. Though depicted as a separate entity in FIG. 1, it is contemplated that the call matching manager 103 may be implemented for direct operation by the telephony system 105. As such, the call matching manager 103 may generate direct signal inputs for influencing operation of the telephony system—i.e., the various VRUs 117—for interacting with user devices that initiate calls. Alternatively, the one or more of the modules 201-221 may be implemented for operation by the telephony system 105 as a platform or hosted solution, wherein the telephony system 105 calls upon the modules as needed via a network.

Figure 6:
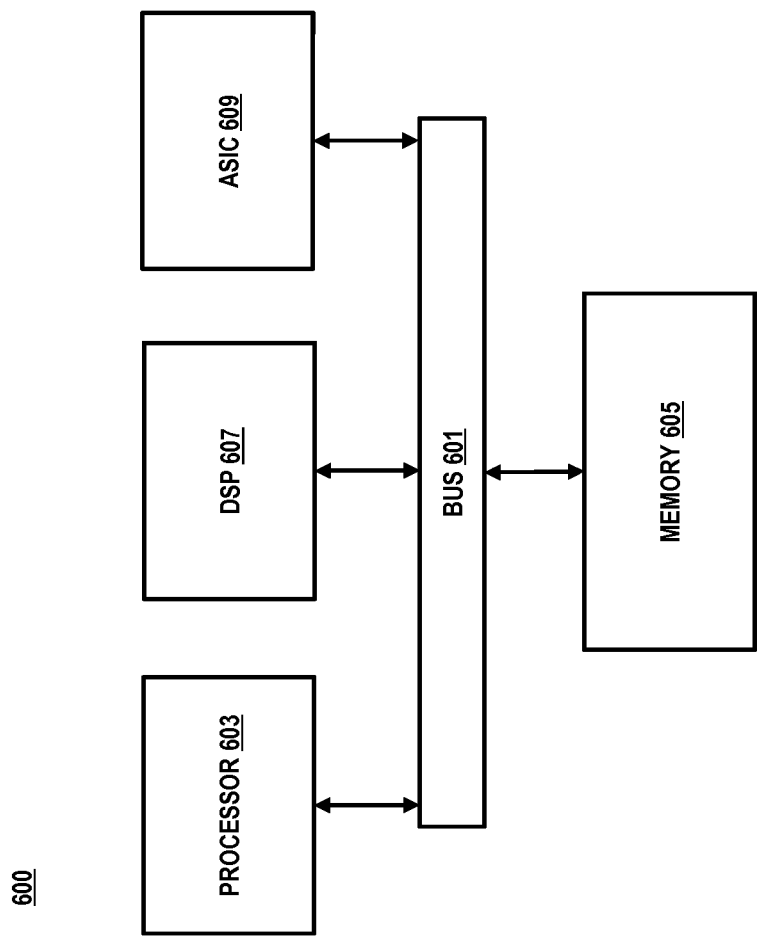
FIG. 6 is a diagram of a chip set that can be used to implement an embodiment of the invention.

FIGS. 3A and 3B and 3B are flowcharts of processes for directing a call to a matching service of a call destination, according to various embodiments. In one embodiment, the call matching manager 103 performs processes 300 and 314 and is implemented in, for instance, a chip set including a processor and a memory as shown in FIG. 6.

In step 301 of process 300 (FIG. 3A), a first voice response unit queries a database associated with the service data to determine whether the caller data matches the service. The matching step is represented by decision step 302. As noted previously, the data associated with the service may include, for example, various files for specifying a profile or account information that may reference the caller with the service. This may include a phone number or account number. As such, when the database includes a reference to the entered data about the caller, the first voice response unit verifies that a match is found between the caller and the service, corresponding to decision step 302b. Thus, the call matching manager 103 determines the call is directed (appropriately) to the first voice response unit; and the call is placed accordingly per step 305.

When no match is identified between the entered caller data and the database associated with the service data, the first voice response unit invalidates the relationship, corresponding to decision step 302a. Per step 303, the call matching manager 103 determines a disparity between the service data and the caller data.

In step 307, the call matching manager 103 determines that a call is to be redirected from a first voice response unit based on service data about a service and caller data about a caller. In step 309, the call matching manager 103 queries, during the call, one or more databases corresponding to a plurality of other services to identify a matching service based on the caller data. As mentioned above, the query procedure may be implemented as a web service that has access to the service databases of respective services configured to the telephony network 105. The query may return a matching service result, service data about the service, or a combination thereof.

In step 311, the call matching manager 103 generates a reference value to associate with the caller data based on a result of the query for use in out-of-band telephony signaling to a second voice response unit associated with the matching service. Per step 313, the call matching manager 103 initiates transfer of the call for processing by the second voice response unit via the out-of-band telephony signaling using the generated reference value. As noted previously, the reference value may be generated as mock ANI data or the like for supporting transfer of the call via the telephony system 105. By way of example, in addition to being a unique value, the reference value may be formatted in a manner suitable for being interpreted by a receiving VRU 107 as signal information via the telephony system 105.

In step 315 of process 314 (FIG. 3B), the second voice response unit determines that the call was transferred based on the generated reference value. In another step 317, the second voice response unit interacts with the call matching manager 103 to identify the caller data associated with the generated reference value. As mentioned previously, this may include retrieving the caller data as stored to a reference value database 119 maintained by the call matching manager 103. Per step 319, the transferred call is placed, via the second voice response unit, in association with the caller data based on the out-of-band telephony signaling. Retrieval of the caller data in association with the seamless transfer process facilitates quick identification of the caller associated with the transfer call as well as rapid response of the service associated with the second voice response unit.

FIG. 4 is a ladder diagram depicting seamless transfer of a call from a first voice response unit to a second voice response unit per the processes of FIGS. 3A and 3B, according to various embodiments. The ladder diagram depicts an interaction between various elements of system 100 of FIG. 1, including a user device 101 as employed by a caller for placing calls over a telephony network (e.g., PSTN 113). Also shown are various components of or related to a telephony system associated with one or more desired services of the caller, including one or more service databases 117a-117n, one or more VRUs 107a-107n and the call matching manager 103. For the purpose of illustration, the telephony system is maintained by a telecommunications service provider that offers various services and/or products. In addition, the caller is a business customer of the telecommunication service provider versus a residential customer.

In step 401, the business caller dials a residential number of the service provider, which is subsequently received by and managed by a VRU 107a corresponding to the residential service. In response to receipt of the call, per step 403, the residential service VRU 107a prompts the user to enter caller data such as a telephone number or other credential (e.g., name, user ID, user account number, etc.). The input may be through a key pad or voice input. Under this scenario, the customer enters their number as (123) 456-7890, which is a number that is related to their business service with the provider. Once entered, the residential service VRU 107a performs a lookup/query of its residential service database 117a to determine whether the number matches any residential service data, corresponding to step 405.

In step 407a, the query result is returned to the residential service VRU 107a for indicating that no match was found for the entered telephone number. Also, in step 407b, the call matching manager 103 is notified that a match was not found. It is noted that steps 407a and 407b may be performed concurrently, such that alerting of the "no match" condition is indicated to both the requesting VRU 107a and call matching manager 103 simultaneously rather than sequentially.

In step 409, the call matching manager 103 performs a query of all of the other service databases (e.g., 117n) associated with the service provider in response to the "no match" condition/disparity being determined. The query may be executed as one or more web services ort corresponding agents thereof that perform quick lookup of the other service databases, including a business service database 117n. Thus, per step 411, the "match found" result for the business service database 117n is determined. It is noted that the caller is unaware of the query procedure. Also, the query and subsequent call transfer process is performed without interruption of the call first placed by the caller.

Per step 413, the call matching manager 103 generates a unique reference value for use in enabling out-of-band signaling of a VRU 107n that is associated with the business residential service. Under this scenario, the unique reference value is generated as a spoof ANI value and/or call number for interpretation by the business service VRU 107n (e.g., (000) 000-1111). In addition, the call matching manager 103 stores the user entered caller data (e.g., phone number (123) 456-7890) to a reference value database (not shown) in association with the unique reference value (000) 000-1111. It is noted, in certain implementations, that the unique reference value may alternatively be generated as a pointer or reference to the location of the business service database 117n for specifying the related service data.

In step 415, the call matching manager initiates transfer of the call to the business service VRU 107n. The transfer may be initiated to occur based on the prior entered caller data by the user to the VRU 107a corresponding to the residential service. Under this scenario, the transfer occurs without requiring the user to speak or manually dial the keypad to enter the number. Various dial tones, alerts or other audible signals may be generated for enabling the caller to recognize the prompt has been automatically responded to and that no action is required on their part.

Per step 417, the business service VRU 107n reads the reference value as generated—i.e., as ANI data—and determines the call is a transferred call as initiated via the call matching manager. In step 419, the business service VRU 107n then interfaces with the call matching manager 103 to facilitate retrieval of the telephone number associated with the reference value. Under this scenario, the VRU 107n prompts the call matching manager 103 to query the reference value database to identify that caller phone number (123) 456-7890 is associated with ANI data (000) 000-1111, corresponding to step 421. By way of this approach, the business service VRU 107n is able to identify the caller for facilitating various customer response actions, account maintenance actions, etc.

As a result of the above described executions, the call as originally placed with a residential service of the service provider is placed with the appropriate business service to which the caller is associated. Of note, the call matching manager may be integrated for use with telephony systems of different configurations. Still further, it is contemplated that the call matching manager 103 may support multiple different telephony systems, such as to facilitate the transfer of calls from the service provider to one or more affiliates of the service provider (e.g., a third party technical support provider).

The processes described herein for directing a call to a matching service of a call destination may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
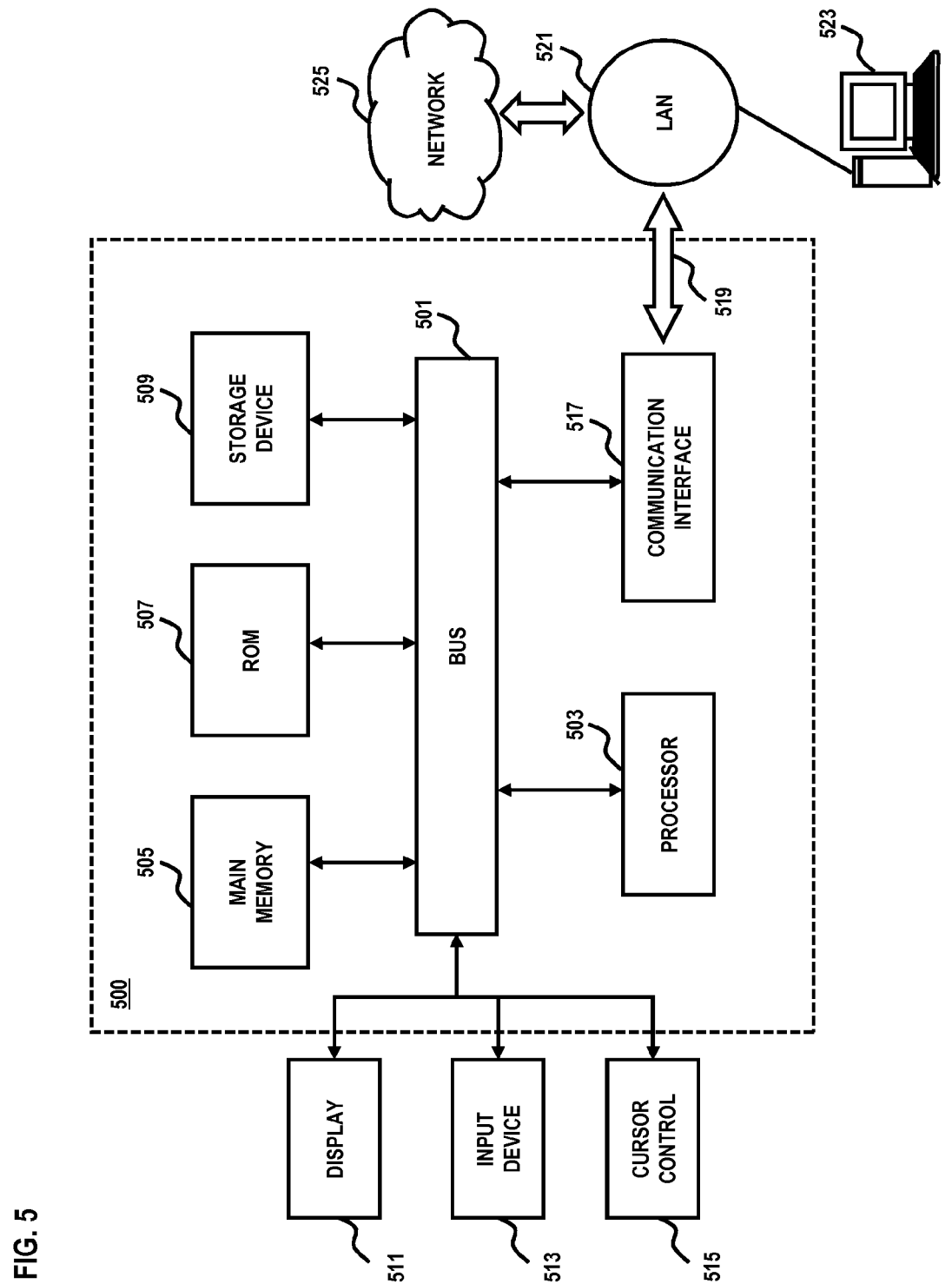
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to direct a call to a matching service of a call destination as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of directing a call to a matching service of a call destination.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC)

609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to direct a call to a matching service of a call destination. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining that a call is to be redirected from a first voice response unit based on service data about a service and caller data about a caller;
   querying, during the call, one or more databases corresponding to a plurality of other services to identify a matching service based on the caller data;
   generating a reference value to associate with the caller data based on a result of the query for use in out-of-band telephony signaling to a second voice response unit associated with the matching service; and
   initiating transfer of the call for processing by the second voice response unit via the out-of-band telephony signaling using the generated reference value,
   wherein the determining that the call is to be redirected from the first voice response unit includes determining that the caller data about the caller does not match caller data associated with the first voice response unit.

2. A method of claim 1, further comprising:
   determining, by the second voice response unit, that the call was a transferred based on the generated reference value; and
   identifying the caller data associated with the generated reference value.

3. A method of claim 2, further comprising:
   placing the transferred call, via the second voice response unit, in association with the caller data based on the out-of-band telephony signaling.

4. A method of claim 1, further comprising:
   determining the call is directed to the first voice response unit; and
   determining a disparity between the service data and the caller data,
   wherein the call is redirected from the first voice response unit based on the disparity.

5. A method of claim 4, further comprising:
   querying a database associated with the service data to determine whether the caller data matches the service.

6. A method of claim 1, wherein the query is performed by a web service associated with the service and the plurality of other services and the service and the plurality of other services are business units.

7. A method of claim 1, wherein the caller data includes a caller identifier, a phone number, customer account information or source information associated with the caller.

8. A method of claim 1, wherein the first voice response unit and the second voice response unit are associated with a telephony system.

9. An apparatus comprising:
   at least one processor; and
   at least one memory including computer program code for one or more programs,
   the at least one memory and the computer program code configured to, with the at least one processor, cause the apparatus to perform at least the following,
      determine that a call is to be redirected from a first voice response unit based on service data about a service and caller data about a caller;
      query, during the call, one or more databases corresponding to a plurality of other services to identify a matching service based on the data;
      generate a reference value to associate with the caller data based on the result of the query for use in signaling to a second voice response unit associated with the matching service; and
      initiate transfer of the call for processing by the second voice response unit via out-of-band telephony signaling using the generated reference value,
      wherein the determine that the call is to be redirected from the first voice response unit includes determine that the caller data about the caller does not match caller data associated with the first voice response unit.

10. An apparatus of claim 9, wherein the apparatus is further caused to:
    determine, by the second voice response unit, that the call was transferred based on the generated reference value; and
    query the one or more databases corresponding to the plurality of other services to identify the caller data.

11. An apparatus of claim 10, wherein the apparatus is further caused to:
    place the transferred call, via the second voice response unit, in association with the caller data based on the out-of-band telephony signaling.

12. An apparatus of claim 9, wherein the apparatus is further caused to:
    determine the call is directed to the first voice response unit; and
    determine a disparity between the service data and the caller data,
    wherein the call is redirected from the first voice response unit based on the disparity.

13. An apparatus of claim 12, wherein the apparatus is further caused to:
    query a database associated with the service data to determine whether the caller data matches the service.

14. An apparatus of claim 9, wherein the query is performed by a web service associated with the service and the plurality of other services and the service and the plurality of other services are business units.

15. An apparatus of claim 9, wherein the caller data includes a caller identifier, a phone number, customer account information or source information associated with the caller.

16. An apparatus of claim 9, wherein the first voice response unit and the second voice response unit are associated with a telephony system.

17. A system comprising:
two or more databases associated with a plurality of services for maintaining caller data about one or more callers; and
one or more web services for querying the plurality of databases during a call to identify a matching service based on the caller data and based on a generated reference value,
wherein the reference value is generated to associate with caller data for initiating transfer of a call via out-of-band telephony signaling in association with the matching service in response to a call being redirected from another service based on service data about the other service and the caller data, and
wherein the call is redirected from the other service upon a determination that the caller data about a caller to the other service does not match caller data associated with the other service.

18. A system of claim 17, further comprising:
a reference generator for generating the unique reference value.

19. A system of claim 17, wherein the matching service and the plurality of services are business units and the caller data includes a caller identifier, a phone number, customer account information or source information associated with the caller.

20. A system of claim 17, wherein the first voice response unit and the second voice response unit are associated with a telephony system.

* * * * *